(12) United States Patent
Hansen

(10) Patent No.: US 8,857,419 B2
(45) Date of Patent: Oct. 14, 2014

(54) PET BALL LAUNCHER WITH TUNED SCOOP FINGERS

(71) Applicant: Kyle Hansen, Castle Rock, CO (US)

(72) Inventor: Kyle Hansen, Castle Rock, CO (US)

( * ) Notice: Subject to any disclaimer, the term of this patent is extended or adjusted under 35 U.S.C. 154(b) by 0 days.

(21) Appl. No.: 13/658,817

(22) Filed: Oct. 24, 2012

(65) Prior Publication Data

US 2013/0284158 A1  Oct. 31, 2013

Related U.S. Application Data

(63) Continuation-in-part of application No. 13/355,517, filed on Jan. 21, 2012.

(51) Int. Cl.
*F41B 3/00* (2006.01)
*A63B 65/12* (2006.01)
*A01K 15/02* (2006.01)
*A63B 59/02* (2006.01)

(52) U.S. Cl.
CPC .............. *A63B 65/122* (2013.01); *A63B 59/02* (2013.01); *A01K 15/025* (2013.01)
USPC ............................................................ 124/5

(58) Field of Classification Search
USPC .............................................................. 124/5
See application file for complete search history.

(56) References Cited

U.S. PATENT DOCUMENTS

| | | | | |
|---|---|---|---|---|
| 3,589,349 | A * | 6/1971 | Parker | 124/5 |
| 6,076,829 | A * | 6/2000 | Oblack | 273/317 |
| 7,686,001 | B2 * | 3/2010 | Fitt | 124/5 |
| 8,418,681 | B2 * | 4/2013 | Levin et al. | 124/5 |
| 2012/0227721 | A1 * | 9/2012 | Geller | 124/5 |

* cited by examiner

*Primary Examiner* — John Ricci

(57) ABSTRACT

The invention relates to a novel pet ball launcher which uses a friction fit, scoop edges, and tuned tines or "fingers" which control the release of the ball and thus arc and distance thereof. Embodiments include a pivot hinged handle for added launch inertia, and a thumb latch to prevent hinging motion for fixed and controlled distanced ball launching.

6 Claims, 6 Drawing Sheets

PET BALL LAUNCHER WITH TUNED SCOOP FINGERS

CROSS REFERENCE TO PRIOR APPLICATIONS

This Application is a Continuation-in-Part of application Ser. No. 13/355,517 filed on Jan. 21, 2012.

FIELD

The invention relates to a novel pet toy wherein a molded ball launcher uses a friction-fit fulcrum method and scoop extensions with tuned "fingers", or extended tines, to grip and throw a ball.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel ball launcher which uses a friction fit, scoop edges, and tuned tines or "fingers" which control the release of the ball and thus arc and distance thereof.

The inventive launcher is constructed in plastic with an elliptical cross section so that the launcher may be pressured without breaking such as when a pet owner places the launcher in a car and has other items on top or pressing upon, the launcher. The launcher will not snap or break easily.

THE INVENTION

Summary, Objects and Advantages

The handle of the launcher is molded to contain an s-curve. Such shape aids in the functions as a fulcrum effect which transfers an appropriate amount of energy to the scoop portion so as to launch the body, herein the ball, in an efficient manner, and with exaggerated distance.

The launcher handle tapers in thickness towards the scoop, or cup, portion which assists in the energy transfer and subsequent launching of the ball as tension and compression work in conjunction with the flexibility of the launcher handle.

The cradling portion of the launcher holds the ball to be launched in conjunction with molded tines or "fingers" which extend to hold the ball until optimum release point. The scoop extensions guide the ball through its release point. The fingers or tines extend and wrap slightly around the ball holding it initially via a friction-fit setting towards its center of gravity and the ball is released upon launching action.

The cup portion contains fore and aft scoop extensions which hold and guide the ball in conjunction with the tuned fingers. If, upon launching mode, the ball is released too early, the ball will exhibit too much arc and thus soar high as opposed to achieving distance. The scoop edges and the tuned fingers control the resting and motion actions of the ball so as to be timed for release at the optimum moment, which should be the inertia point roughly overhead of the user and more parallel to the targeted launch area.

The tuned fingers extend slightly more inward than the top edges of the fore and aft scoop extensions and serve to hold the ball until release point whereupon the scoop extensions serve to guide the flight of the ball. Finally, an ergonomic handle is piece-molded onto the end of the launcher shaft.

In summary, the inventive launcher is simple, yet scientifically designed to achieve optimum performance when launching a ball therefrom.

An added embodiment includes a hinged portion of the ball holder wherein a hinge or pivot is located on the upper arm, and supplies a snap-action or flicking motion to impart force and release the ball.

Further to the snap-action feature on the upper arm, a gravity operated latching device is present which will lock the hinge when the ball launcher is pointed downward. This feature allows easier ball pick up for a user who then essentially scoops up the ball for repeated launch and retrieval.

The aforementioned latching device includes a thumb-operated restraint so the toy can also be used with the pivot feature locked. This function allows shorter distance and improved control of launched balls. The latch is simply slid forward with the thumb to lock and prevent the pivoting function.

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in six relatively simple figures; although sufficiently complex as to illuminate to one skilled in the art of such manufacturing and design, a viable method for making or using said invention.

Figure 1:
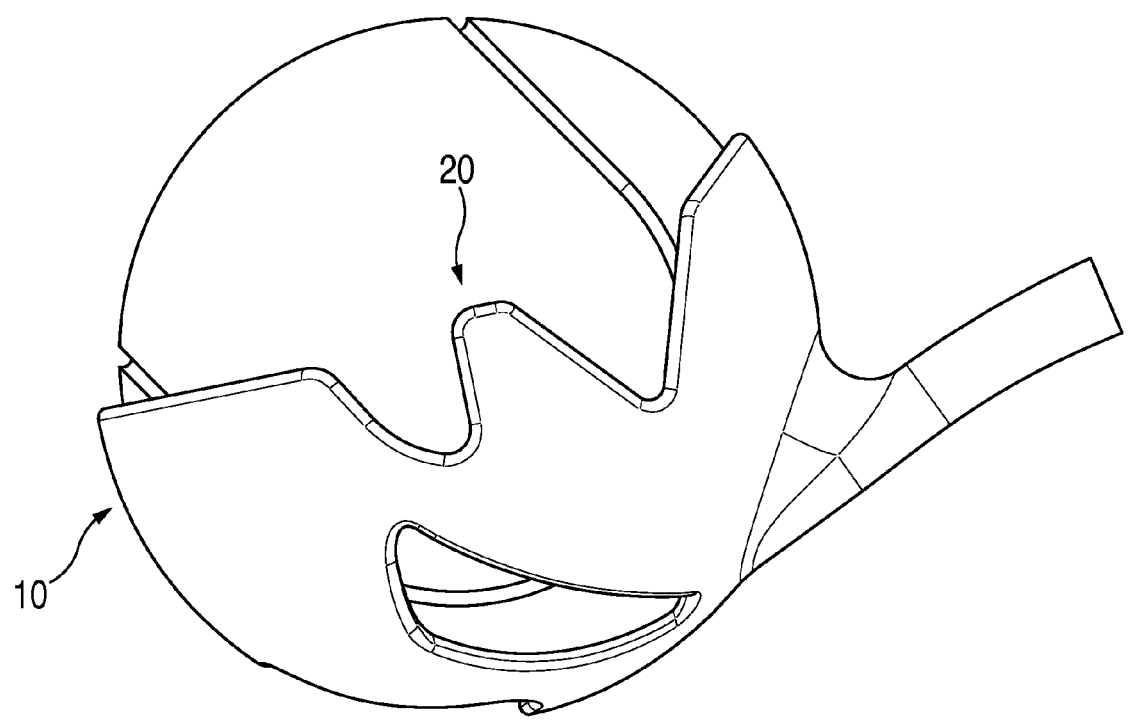
FIG. 1; is a side view of the launcher showing a ball in the scoop, scoop extensions, and the tuned fingers at the scoop center.

FIG. 1 is side view of the scoop or cup portion 10 of the launcher. A tennis ball is shown cradled in the scoop portion 20. The tuned finger extrusions 30 are illustrated as they will loosely grip the ball more than the illustrated 40 scoop fore and aft extensions. Responding to friction and exposed to inertia, the extensions 40 will assist in guiding the direction of flight of the ball, while the fingers 30 are continuing to slightly grip the ball until the optimum point of release.

Figure 2:
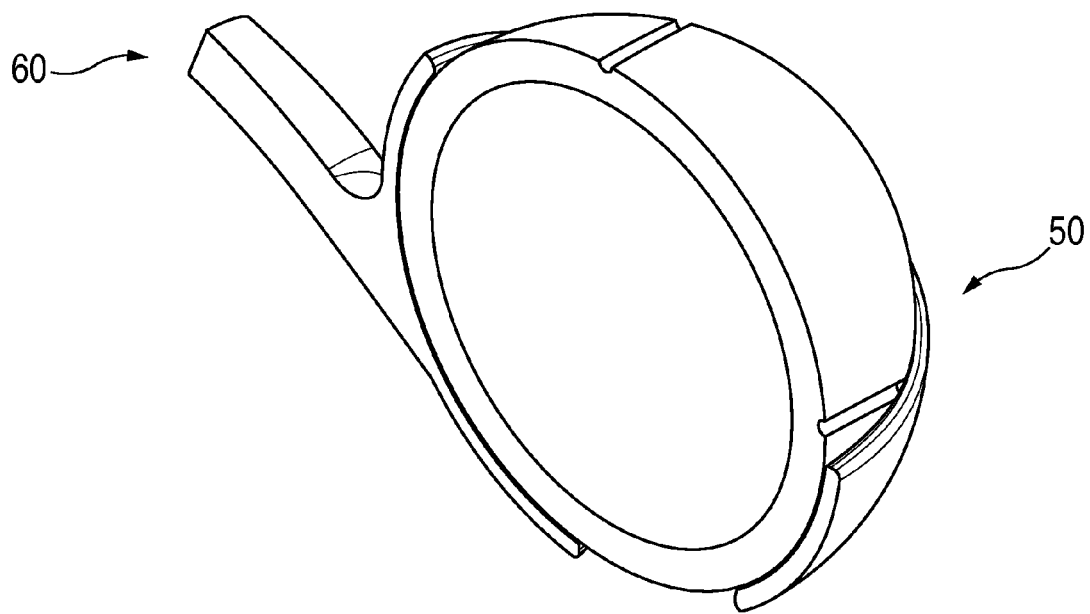
FIG. 2; is an angled cross-sectional view of the launcher showing a ball at rest in the cup or scoop portion.

FIG. 2 is a simple side angle cross-sectional view of the scoop 50 and handle 60 portions illustrating a clear example of the ball resting in the cup portion of the launcher.

Figure 3:
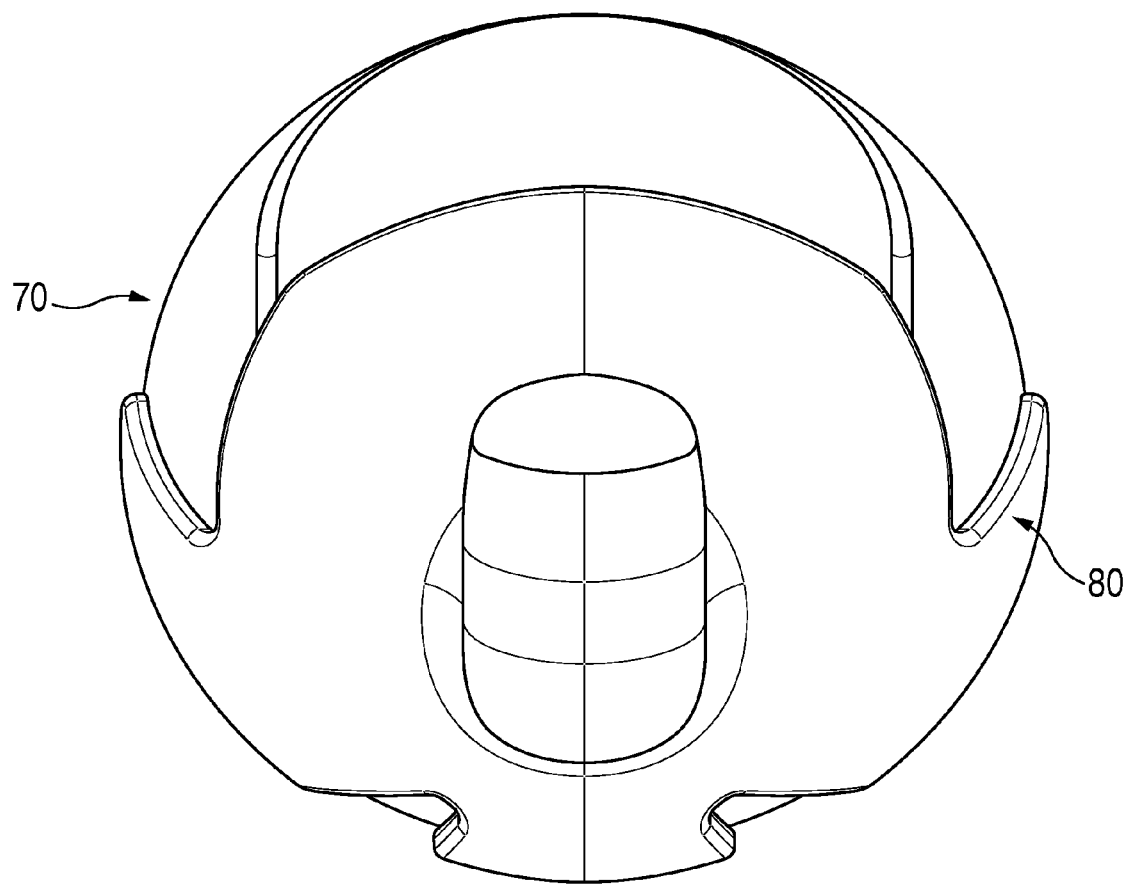
FIG. 3; is a rear section view of the scoop or cup and handle connection point.

FIG. 3 is a rear angle view to illustrate the general height differential of a resting ball 70 within and above the scoop and the scoop extensions 80.

Figure 4:
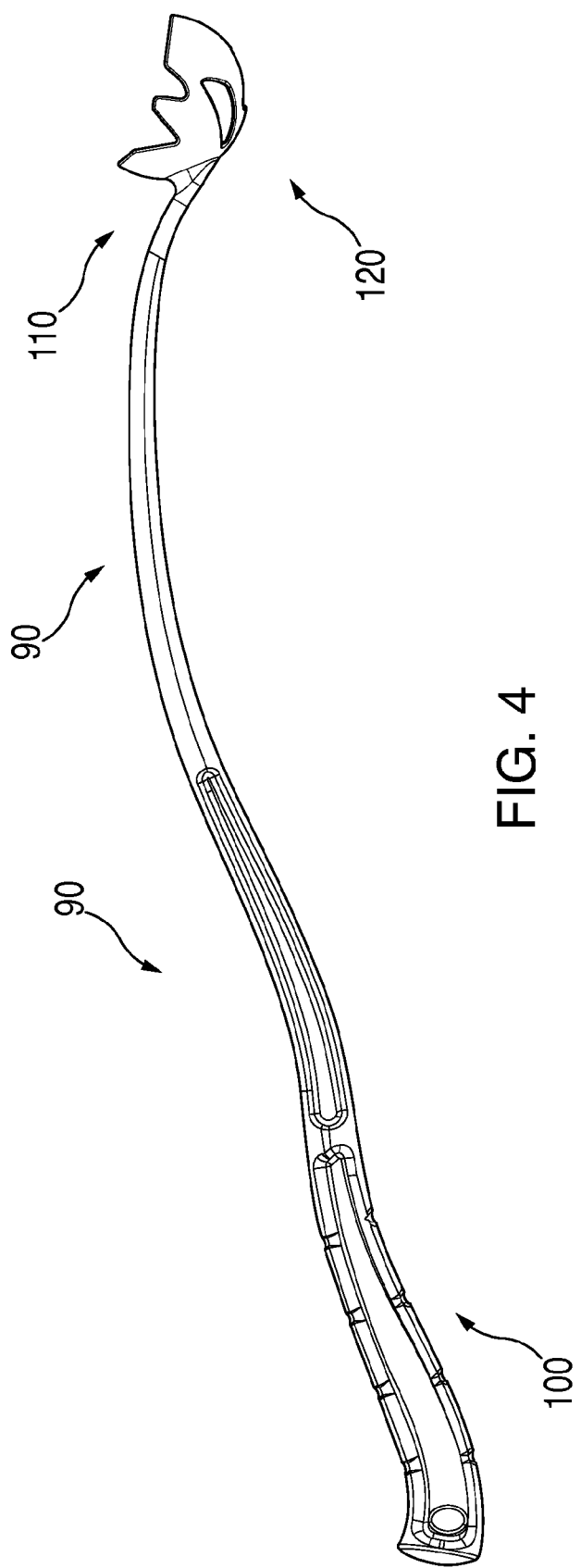
FIG. 4 is a side view of the entire launcher.

FIG. 4 is a side view of the entire launcher. The angle of the handle 90 assists in the fulcrum action of the launcher, which action transfers an appropriate amount of energy to the scoop portion so as to launch the body, herein the ball, in an efficient manner, and with exaggerated distance. A comfortable ergonomic handle 100 is piece-molded onto the launcher. The handle tapers 110 towards the scoop or cup portion 120 of the launcher. Such tapering aids in the energy transfer and subsequent launching of the ball as tension and compression work in conjunction with the flexibility of the launcher handle.

Figure 5:
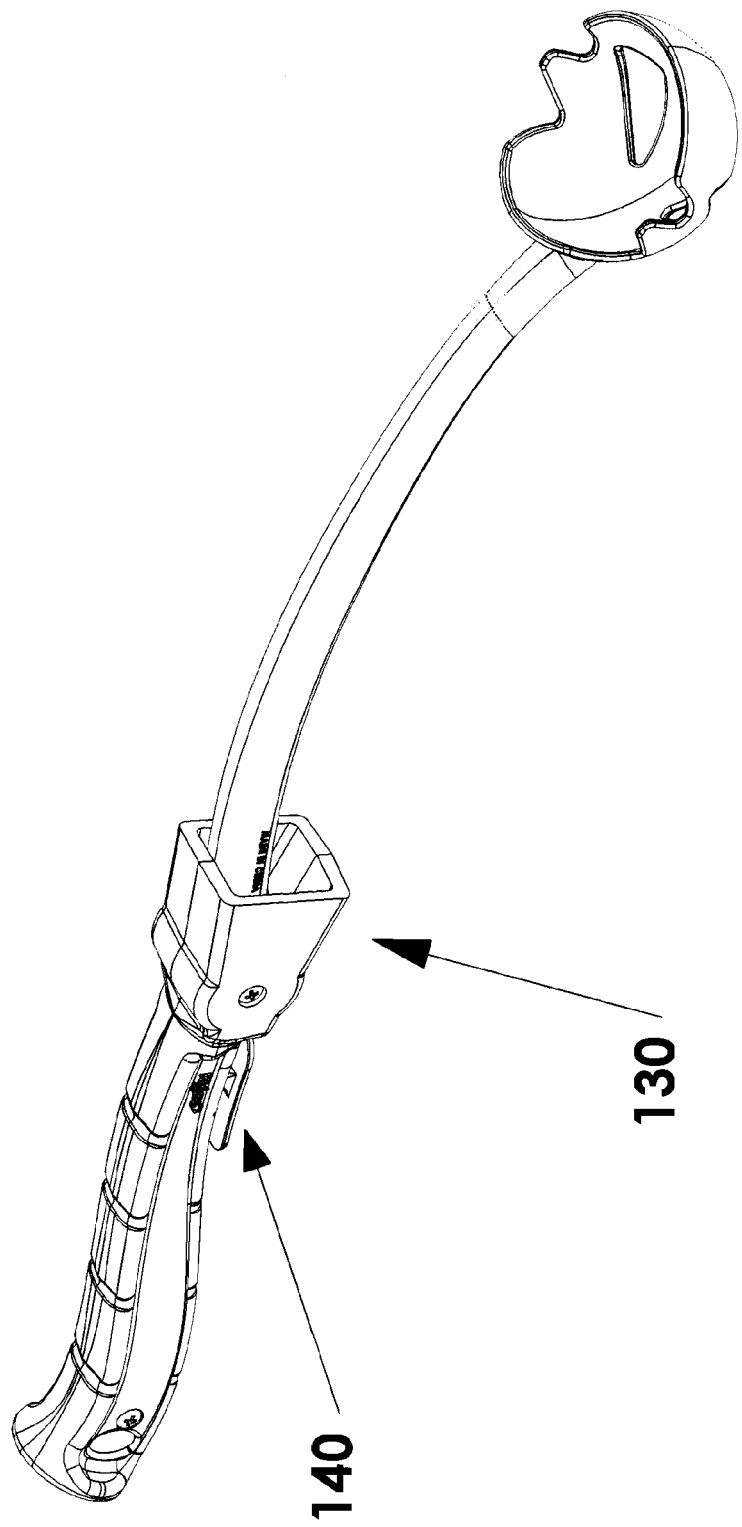
FIG. 5 is an angled perspective of the launcher showing the hinge pivot feature.

FIG. 5 shows the added embodiment of the hinged pivot 130 which supplies a snap-action or flicking motion to impart force and release the ball. Angled, the arm piece will arc back and snap forward upon launching action by the user and add force to the ball trajectory. Partially shown is the gravity operated latching device 140 which remains locked when the launcher is held downward.

Figure 6:
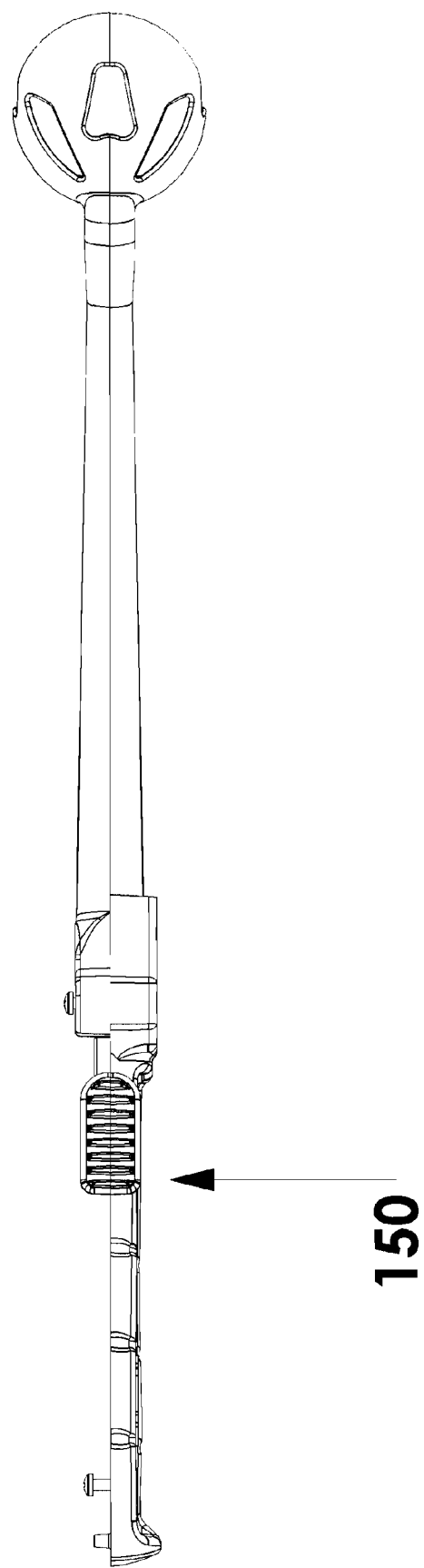
FIG. 6 is a bottom view of the launcher showing the thumb latch.

FIG. 6 is a bottom view of the launcher showing the thumb latch 150 which either slides in place when the toy is pointed downward, or may be manually slid with a thumb to lock the pivot functionality and prevent the hinge from operating. When not locked in this manual fashion, the latch will operate by simple gravity and allow for hinging or not of the handle based upon whether there is pressure exerted on the latch (the toy being held upwards or downwards).

The invention claimed is:

1. A plastic pet ball launcher with an elliptical cross section comprising:
 a) a tapered s-shaped handle with grip
 b) tuned fingers on the scoop portion
 c) scoop portion with extensions
 d) pivot hinge at handle
 e) thumb locking latch on handle.

2. The pet ball launcher of claim 1 wherein said handle has an ergonomic grip at one end.

3. The pet ball launcher of claim 1 wherein the tuned fingers are extensions of the launcher's scoop portion and wrap slightly inward and around a ball loosely to hold the ball until an optimum release point.

4. The pet ball launcher of claim 1 wherein the scoop portion of the launcher has extensions fore and aft which are slightly longer and straighter than the tuned finger extensions as originated from the handle perspective and serve to guide the ball upon launch.

5. The pet ball launcher of claim 1 wherein a pivot hinge supplies a flicking motion when launching to provide added inertia to the launched ball and will automatically lock the handle in fixed position when the launcher is pointed downward aiding in pick-up of a ball from the ground.

6. The pet ball launcher of claim 1 wherein a thumb latch is located on the tapered handle which, when pressed, resets the hinge to a hinging position so that the ball may be launched again.

* * * * *